United States Patent [19]

Shen

[11] Patent Number: 4,551,274
[45] Date of Patent: Nov. 5, 1985

[54] ELECTROLYTIC TREATMENT OF VEGETABLE PROTEIN

[75] Inventor: Jerome L. Shen, St. Louis, Mo.

[73] Assignee: Ralston Purina Company, St. Louis, Mo.

[21] Appl. No.: 679,099

[22] Filed: Dec. 6, 1984

Related U.S. Application Data

[63] Continuation of Ser. No. 525,513, Aug. 22, 1983, abandoned.

[51] Int. Cl.$^4$ .............................................. A23J 1/14
[52] U.S. Cl. .................................. 260/123.5; 204/131; 204/106.1; 204/180.1; 260/112 R; 426/656
[58] Field of Search ................... 260/112 R, 123.5; 204/131, 160.1

[56] References Cited

U.S. PATENT DOCUMENTS 4,208,259  6/1980  Oughton .................. 260/123.5 X
4,386,110  5/1983  Komeyasu et al. .............. 426/244

OTHER PUBLICATIONS

Bioelectrochemistry and Bioenergetics, vol. 3, pp. 328–337 (1976), Scheller et al.
J. of Biol. Chem. 239, No. 12 (1964), 4163–4170, Markus.
Analytical Biochemistry, 76 (1976), 170–176, Weitzman.
Biochemical Journal, 93, No. 1 (1964), 1–11, Cecil et al.
Biochemistry, 4, No. 1, (1965), 23–27, Leach et al.

*Primary Examiner*—Howard E. Schain
*Attorney, Agent, or Firm*—Virgil B. Hill

[57] ABSTRACT

A process for the treatment of a vegetable protein is disclosed wherein the disulfide bonds of the protein are electrolytically reduced to provide a protein of improved functionality. Electrolytic reduction also results in unexpected removal of many of the naturally occurring pigments contained in a vegetable protein, such as soy protein, to provide a protein of improved whiteness.

32 Claims, 2 Drawing Figures

ELECTROLYTIC TREATMENT OF VEGETABLE PROTEIN

This is a continuation of application Ser. No. 525,513, filed Aug. 22, 1983 now abandoned.

BACKGROUND OF THE INVENTION

The present invention relates to a process for the treatment of isolated vegetable protein to provide an isolate of improved functionality and whiteness.

Vegetable protein materials such as soy protein, in their native state, contain glycinin as the major storage protein which is located in the subcellular particles called protein bodies. The glycinin is a compact, globular protein in which many of the amino acid residues are buried in the interior of the protein globules and therefore unavailable for reaction. The protein globules are held together by hydrogen bonding, hydrophobic interactions and disulfide bonding. It would be highly desirable to achieve a significant degree of reduction of the disulfide bonds of the protein to thereby dissociate or unfold the protein and prevent its reaggregation. Dissociation and reduction of the protein should provide the protein with improved properties such as better solubility, lower viscosity and other functional improvements therefore being more useful in a number of food and industrial applications.

Chemical reduction of the disulfide bonds of a vegetable protein material by a reducing agent has been employed but typically achieves minimal reduction of the disulfide bonds because many of the bonds are inaccessible to the chemical reducing agent. While the application of heat to a solution of the protein material will also assist in dissociation or unfolding of the protein particularly when employed in combination with chemical reduction of the disulfide bonds, less than 70% reduction of disulfide bonds takes place because the proteins aggregate upon the application of heat thereby preventing complete or substantial reduction of the disulfide bonds. Furthermore, the use of chemical reducing agents will many times render the protein product unsuitable for food applications. The protein contained in vegetable protein materials such as soybeans could be made more functional and useful for food applications if a means could be found for a substantial reduction of the disulfide bonds of the protein, thereby unfolding the compact structure of the protein and making it more available for other chemical reactions.

The means for reducing disulfide bonds of the protein contained in vegetable protein materials such as soybeans has been achieved in the present invention by the use of an electrolytic reduction process for conversion of the disulfide bonds contained in the protein thereby permitting the protein to unfold and dissociate from its compact form thereby providing an isolate of an improved degree of functionality for food and industrial applications. An unexpected advantage of the present process without regard to whether or not the disulfide bonds of the protein are reduced is an improved degree of whiteness of the protein material obtained following electrolytic reduction. The exact reason for this unexpected phenomenon is not completely understood but apparently electrolytic reduction also reduces the chlorogenic pigments which are apparently trapped or entrained in the native protein structure, thereby altering or eliminating these pigments which results in a protein material which has a more pronounced degree of whiteness than any protein isolate which has heretofore been available.

It is therefore an object of the present invention to provide a process for the treatment of a vegetable protein material to provide a material of improved functionality and whiteness.

It is an object of the present invention to provide a process for the treatment of a vegetable protein material to provide an isolate of improved functionality and whiteness.

It is a further object of the present invention to provide a process for the treatment of an isolated vegetable protein material, particularly soybeans, wherein the disulfide bonds of the protein material are significantly reduced thereby permitting the formation of a protein of an improved degree of functionality for food and industrial applications.

It is a still further object of the present invention to provide a process for the reduction of the disulfide bonds of a vegetable protein material that is significantly more efficient and easy to perform than those methods that have been employed in the prior art.

It is a still further object of the process of the present invention to provide a protein material which has an improved degree of whiteness over protein materials produced in the prior art.

SUMMARY OF THE INVENTION

The present invention sets forth a process for the treatment of a vegetable protein material such as soy protein having disulfide bonds wherein a substantial amount of disulfide bonds are reduced which comprises forming an aqueous slurry of the vegetable protein material and electrolytically reducing the disulfide bonds of said vegetable protein material to produce a dissociated protein material having improved functional properties and which unexpectedly results in the removal of a substantial amount of the pigment containing materials that are either naturally present in vegetable protein or are formed during processing of the vegetable protein material. The presence of these pigments adversely effect the color of protein isolates or other products produced from these vegetable protein materials.

Electrolytic reduction of the disulfide bonds of the vegetable protein material provides a dissociated protein material which has an improved degree of solubility and a lower viscosity thereby having improved functionality in food applications. Electrolytic reduction results in almost complete or substantial reduction of the disulfide bonds contained in the globular protein material without significant aggregation or agglomeration of the protein as normally takes place when chemical reduction and heat is employed to reduce the disulfide bonds contained in the protein.

Electrolytic reduction also employs no significant amount of chemicals insofar as performing the reduction reaction and can also be run at neutral pH thereby avoiding any damage to the protein that might occur at more extreme acidic or alkaline pH levels. The procedure employed in the present invention is easy and convenient to perform on a continuous basis and produces a protein material which not only has a wide variety of food applications but can be used as a desirable intermediate for the further reaction of exposed or reactive sites on the protein molecule to thereby modify the protein material in such a manner that it can be further utilized in a wide variety of food and industrial applications.

A most unexpected aspect of the present invention, without regard to electrolytic reduction of the disulfide bonds of the protein material, is the almost complete degree of pigment removal from the vegetable protein material that takes place by the use of electrolytic reduction. The protein obtained by the process of the present invention provides a product having more complete removal of native pigments contained in the protein or pigments formed during processing of the protein material than any process which has heretofore been practiced in the prior art.

DESCRIPTION OF THE PREFERRED EMBODIMENTS

Figure 1:
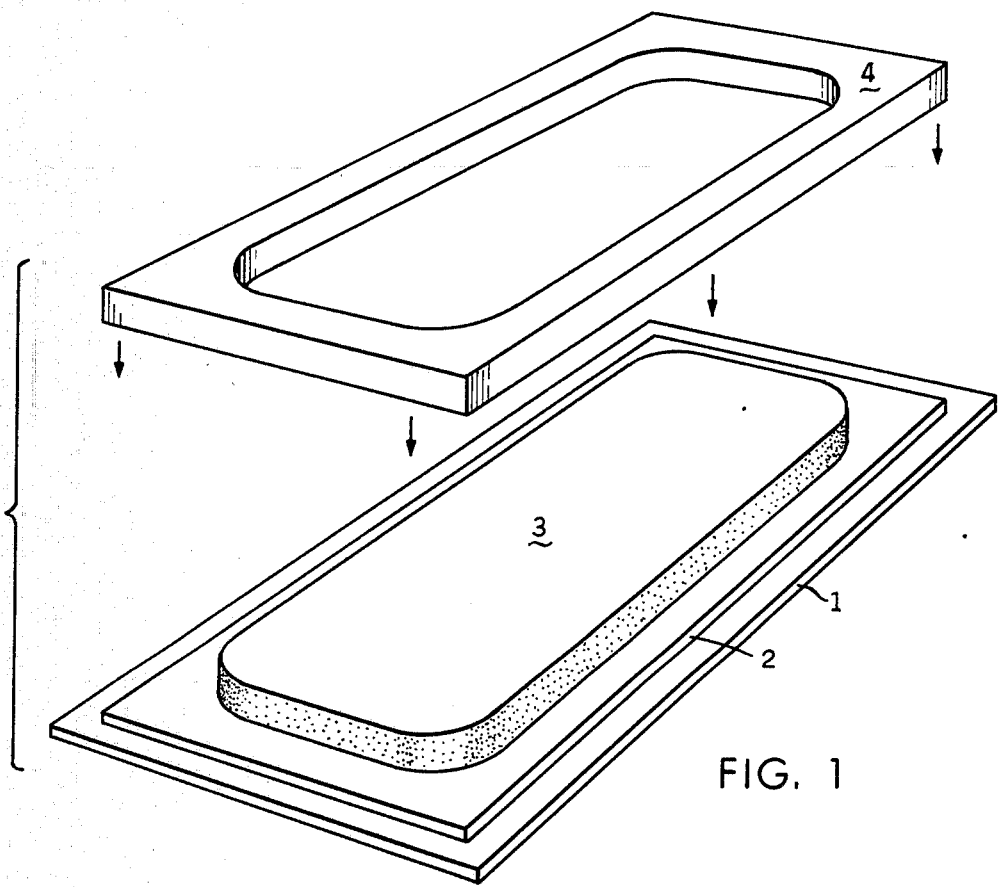

The present invention applies to a vegetable protein material and preferably to soy protein. The present invention is therefore described with regard to soy protein since this is the primary area of concern for which the present invention was developed, although it is apparent that other vegetable proteins can be employed.

The present process is also applicable to any type of vegetable protein material such as concentrates, flours, flakes, including an aqueous extract of a vegetable protein material and the present invention is not intended to be limited by the exact type of vegetable protein material to be treated. The present process however is most applicable to the treatment of a vegetable protein isolate.

An isolated soy protein, for example, is typically prepared by treatment of defatted soy flakes with an alkaline solution in order to solubilize the protein. The protein is then separated from the alkali insoluble solids by filtration or centrifugation. The proteinaceous solution is subsequently precipitated in the form of a curd by adjustment of the pH of the solution to the isoelectric point of the protein which is usually between about 4 to 4.5 in the case of soy protein. The curd can be dried to produce a granular dried protein material of greater than 95% purity. In the context of the present invention, the curd, without further processing, may be utilized in the reaction which is hereafter described. It is not intended however to limit the present invention to only the curd or precipitated protein and the present invention is equally applicable to a vegetable protein material or soy protein isolate which has been otherwise processed and dried although the dried isolate or material must be placed in the slurry form prior to carrying out the reaction which is described below.

An aqueous slurry of a vegetable protein material or the extract of the vegetable protein material is initially formed, typically having a proteinaceous solids content sufficient for electrolytic reduction of the disulfide bonds, and preferably a solids content of between about 1 and 20% by weight, most preferably between about 10 to 18% by weight. The exact minimum concentration of proteinaceous solids in the slurry is not critical relative to the practice of the present invention and is dependent on the efficiency or rate of reduction that is desired although if the level of solids substantially exceeds 20% then contamination or deposition of the protein on the electrode can minimize efficiency of the process. Certainly, it is apparent that a higher solids level is preferred for maximum economy and efficiency although it may be desirable in some instances to operate a very low solids level of 1% or less depending on the exact nature of the protein, the cell design or other factors. The aqueous slurry of the isolated vegetable protein is then typically adjusted so that the slurry will have a pH of at least about 4.5 and preferably a pH which is between about 6 and 8. The exact pH is not critical; however, the rate of reduction decreases significantly at a pH much greater than about 8.

It is preferable, although not critical relative to the electrolytic reduction reaction carried out in the present invention, that for maximum conversion of the disulfide bonds contained in the vegetable protein material that a catalyst be included in the slurry in an amount effective to catalyze the reduction of the disulfide bonds. The need for a catalyst in electrolytic reduction of the disulfide bonds is entirely dependent on the efficiency of the reduction process desired and can depend on the electrode design, or factors related to operation of the electrode such as current density or electrode potential. The exact catalyst that may be employed is not critical to the practice of the present invention and can be selected from a wide variety of materials having a comparable reduction potential in aqueous solution to the disulfide bonds of the protein material. A preferred material is the use of a sulfhydryl reagent such as dithiothreitol or cystine. Either of these compounds have active sulfhydryl (SH) groups which readily catalyze the reduction of the disulfide bonds by the electrolytic reduction reaction carried out in the present invention. Other catalysts may also be employed and include materials such as glutathione or pterine.

If a catalyst is used, it is preferred that the sulfhydryl catalyst be added to the aqueous protein containing slurry in an amount sufficient to provide a catalyst (SH) mole to protein (SH) mole ratio of at least about 1.5. This mole ratio is intended to refer to the amount of reactive sulfhydryl groups contained in the protein solids and it is important although not critical that this be maintained at a level of at least about 1.5 with the preferred sulfhydryl catalyst selected for use in the present invention. A more preferred ratio is that the catalyst (SH) mole ratio to provide solids (SH) mole ratio be at least about 2 or greater for maximum efficiency depending on the conditions or the exact nature of the catalyst that is employed. At the noted solids range of between about 1 to 20% protein solids in the slurry a typical amount of sulfhydryl catalyst employed is between about 2 to 3% by weight of the protein solids. The amount of catalyst used is not critical, however, since the addition of catalyst relates only to the efficiency and not the operativeness of the process of the present invention.

It is not critical to the practice of the present invention that any significant degree of heating of the slurry be carried out for performing the electrolytic reduction of the disulfide bonds of the vegetable protein material. A significant degree of heating is undesirable in view of the fact that this results in aggregation of the protein and minimizes the effect of the electrolytic reduction reaction. It is therefore preferable, although not critical, that the temperature of the slurry be maintained at a temperature below about 60° C. and preferably is maintained at a temperature of between about 15° and 60° C.

Following formation of the slurry, electrolytic reduction of the disulfide bonds of the vegetable protein is carried out wherein an electrolytic cell configuration having a cathode and anode is employed such that the disulfide reduction occurs in the cathode half cell and in the anode half cell an oxidation reaction occurs. The specific configuration of the cell employed to electrolytically reduce the vegetable protein slurry pursuant to the present invention is not critical to its practice since the exact configuration of the cell can vary greatly depending upon efficiency and economy desired as well as the regulatory limits on the various materials that may be employed depending on whether a food or non-food related application is involved.

A preferred and desirable electrode arrangement for electrolytic reduction of the vegetable protein pursuant to the present invention is the use of a carbon felt electrode as the cathode for reduction of the disulfide bonds of the protein. Carbon felt is a highly porous sponge like carbon material produced by Fiber Materials, Inc., Bettaford, Mass. 04005. The carbon felt provides a rigid continuous surface for reduction of the disulfide bonds by electrolytic means. The carbon felt electrode is prepared by employing a conventional graphite flat surface electrode available from either Ionics, Inc., Watertown, MA 02172 or Eco Instruments, Newton, MA 02153, which was polished until the surface of the electrode was completely smooth. A 3.5 centimeter wide, 17.0 centimeter long and 2.2 centimeter thick piece of graphite felt was cut and glued to the graphite electrode with an epoxy bonded graphite cement. The use of the graphite cement resulted in an electrode surface of exceptionally good mechanical strength with good electrical contact between the graphite electrode and the piece felt surface. A rubber or neoprene gasket of approximately 2.2 centimeters thickness that fits tightly around the entire felt was used to seal the electrode. The use of the carbon felt provides a highly porous surface providing significantly higher surface area than the use of flat surface graphite alone and is very very suitable for use in the process of the present invention.

Figure 2:
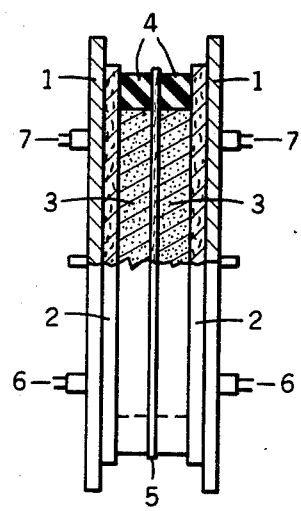

With specific reference to FIGS. 1 and 2, a preferred electrode design for use in the present invention is illustrated. FIG. 1 shows the preferred cathode or anode design wherein a support plate 1 is provided for the graphite electrode 2 to prevent damage thereto. The porous carbon felt 3 is glued to the graphite electrode 2 and the neoprene gasket 4 is also illustrated which conforms to the shape of the carbon felt 3 and prevents loss of the slurry or solution from the cell.

FIG. 2 sets forth a side view of the cell containing both the cathode and anode design which is illustrated in FIG. 1. As previously noted, the exact configuration of the cell or design thereof is not intended to limit the present invention and the cell configuration described below shows only an illustrative and preferred embodiment of a suitable cell for use in the present invention.

In FIG. 2, a "sandwich" arrangement of the cathode and anode is set forth wherein a support plate 1 is illustrated for both the cathode and anode. The dual graphite electrode plates 2 and dual pieces of carbon felt 3 glued to the plates provide the anode and cathode for use in the present process. A cut away view of the carbon felt 3 shows the neoprene gasket 4 which effectively seals the cell. The two pieces of carbon felt 3 which comprises the cathode and anode are adjoined by a semi-permeable membrane 5 which permits ion but not protein migration between the cathode and anode to provide complete electrical contact for the cell. An inlet 6 is provided for the cell on both the cathode and anode sides for the solutions or slurries to be pumped into the separate anode and cathode carbon felt comparments 3 of the cell. An outlet 7 is also provided for the cell on both the cathode and anode sides for exit of the reduced or oxidized solution or slurry from the cell. In the actual operation of the cell, the aqueous slurry of protein is passed through the inlet port of the cathode side of the cell and a solution of an easily oxidizable compound such as a solution of $SO_3=$anion or another protein slurry is passed through the anode side of the cell. The electrolytically reduced protein slurry and electrolytically oxidized compound exit the cathode and anode respectively. It is not critical to the present invention what electrolytic medium is used for the cell, and other types of electrolytic mediums may be employed on which the oxidation reaction in the anode portion of the cell is necessarily carried out.

Other types of electrode designs are equally suitable and among which are fluidized or packed bed electrodes which employ activated carbon or graphite packing material which result in electrodes of very large surface areas thereby providing an apparatus which has a high degree of efficiency for carrying out the electrolytic reduction of materials.

Electrolytic reduction of the protein material is carried out at a current density and rate such that substantial reduction of the disulfide bonds of the vegetable protein or an improvement in whiteness of the protein takes place. The amount of or rate of current applied to the electrode for electrolytic reduction is not critical to the present invention and is entirely dependent on the cell design, conductivity of the medium and electrode material, or other factors unrelated to the process of the present invention. The level of current or current density can readily be determined by one skilled in the art and is applied at a level sufficient to maximize disulfide bond reduction or eliminate pigments from the protein solution or dispersion, as the case may be. For slurries containing 10% protein solids and for a desirable efficiency for conversion of disulfide bonds in a vegetable protein material reduction preferably is carried out at a current density of at least about 2 m amp/m$^2$ for an amount of time that is sufficient to substantially reduce the disulfide bonds of the isolated vegetable protein or substantially reduce the pigment level in the protein material or extract, as the case may be. The exact time that is required for purposes of completing substantial reduction of the disulfide bonds is not critical to the practice of the present invention and is entirely related to other factors such as the current applied, nature of the electrode, electrode design, surface area of electrode and many other factors which can be readily controlled and determined by one skilled in the art for purposes of maximum efficiency in carrying out the reaction of the present invention. Typical times, however, for complete reduction of the disulfide bonds of the vegetable protein contained in the slurry of the present invention with the preferred and illustrative electrode shown in FIGS. 1 and 2 is at least about 30 minutes and preferably between about 30 minutes and 8 hours.

Following electrolytic reduction of the protein, the protein may be isolated and dried if desired although it is one embodiment of the present invention that prior to drying or commensurate therewith that the reduced protein material be reacted with a blocking agent in an amount effective to prevent substantial reformation of the disulfide bonds either during or after drying of the protein material. Without blocking of the reduced bonds, the material reoxidizes in the presence of air to reform the disulfide bonds and alter the functional properties of the protein material obtained pursuant to the present invention. This may be a drawback only if it is desired to retain the functional or chemical properties of the reduced protein since even if reformation occurs, no substantial change in color development takes place after the pigments have been altered. Therefore, the use of a blocking agent is only an optional embodiment of the present invention to prevent the reformation of the disulfide bonds over an extended period of time. Reformation of the disulfide bonds may not be a significant problem especially if the reduced protein is processed or reacted to form another product without prolonged standing.

The most striking aspect of the process of the present invention, at least in the case of soy protein, is the significant removal of the naturally occurring yellow-brown color pigments during electrolytic reduction. Electrolytically reduced slurries of soy protein have significantly less yellow color. Even more significant is the fact that the yellow-brown color pigments commonly associated with soy protein can be removed from an isolate which has already undergone alkali solubilization and acid precipitation and has been spray dried. Most of the color components which are formed during alkali extraction of the vegetable protein material and bound to the protein during acid precipitation and drying can also be removed by the electrolytic reduction process employed in the present invention. The color also does not reappear upon further processing of the electrolytically reduced vegetable protein material as by heating of the same or alkaline or enzymatic hydrolysis. The present process can therefore be used only for color removal of the pigments contained in soy protein even if no significant reduction of the disulfide bonds of the protein is desired. This color removal aspect of the present process is applicable to "curd" or also to a dried isolate which has been previously processed and for which color or pigment removal is desired. It is felt that the native color components contained in the soy protein are reduced to non-colored components at the electrode and the rate of pigment elimination from the soy protein is comparable to the rate of reduction of the disulfide bonds.

The following Examples represent specific but non-limiting embodiments of the present invention.

EXAMPLE 1

200 ml of an aqueous slurry of soy protein isolate having a proteinacous solids level of 2% by weight was prepared by dispersing 8 grams of dried soy isolate in 200 ml of a 0.5 molar phosphate buffer also containing $10^{-3}$ molar ethylenediaminetetraacetic acid. This resulted in a slurry with a pH of 7.0. The slurry was centrifuged at 42,000×g for 10 minutes. The resulting slurry has a protein content of 15.6 g/liter as determined by the Biuret method as described by Layne, E., *Methods In Enzymology*, Volumn III (Academic Press, N.Y., 1957, Page 450). An electrolytic cell was used comparable to that described in FIGS. 1 and 2 wherein a ⅛" thick piece of carbon felt was used as both the anode and cathode. The anode was filled with a solution of 0.25 molar sodium sulfite in the 0.5 molar phosphate buffer to provide a solution in the anode which had a pH of 7.4. 41.3 mg of Dithiothreitol was dissolved in 150 ml of the slurry as the catalyst. This provided a catalyst (SH) mole to protein solids (SH) mole ratio of 2.2.

The total SH concentration at the start of the reaction and during the reaction was monitored by taking aliquots and reacting them with 5,5'-dithio-bis(2-nitro benzene acid), (DTNB) as described by Ellman, G. L., *Arch. Biochem. Biophysics*, 82 (70) 1959. The theoretical level of sulfhydryl groups in the protein solids in the slurry was calculated from the cysteine content of the protein isolate determined by separate analysis and the protein concentration as 1716 moles (SH) per liter. 68 ml of the slurry was passed through the cell on a continuous basis and 100 milliamps of current to the cell during electrolytic reduction.

The time of measurement are recorded in Table 1 together with the calculated level of (SH) moles for the level of protein solids in the slurry as determined from the absorbance readings.

TABLE 1

| Min/Sec Time | Mole (SH) Liter |
| --- | --- |
| 0 | 3324 |
| 9:47 | 3551 |
| 18:40 | 3787 |
| 27:31 | 3919 |
| 38:10 | 4007 |
| 47:12 | 4066 |
| 57:34 | 4243 |
| 67:08 | 4294 |
| 77:05 | 4412 |
| 86:20 | 4456 |
| 96:30 | 4559 |
| 106:42 | 4699 |
| 122:50 | 4493 |
| 132:40 | 4801 |
| 142:42 | 4831 |

The percentage of reduction of the disulfide bonds was calculated as $$\frac{\text{Mole (SH)} \text{ End of Run} - \text{Mole (SH)} \text{ Beginning of Run}}{\text{Mole (SH) Available for Reaction in Protein Solids}} \times 100 = \frac{4831 - 3324}{1716} \times 100 = 86.1\%$$

It may be seen that electrolytic reduction was highly effective in achieving a substantial reduction of the disulfide bonds of the soy protein isolate to sulfhydryl groups.

EXAMPLE 2

500 ml of aqueous slurry of a soy protein isolate having a protein solids level of 10% by weight was prepared by dispersing 54 grams of dried soy isolate in 500 ml of a 0.5 molar phosphate buffer containing $10^{-3}$ ethylenediaminetetraacetic acid. This resulted in a slurry with a pH of 7.0 which was not centrifuged prior to reduction.

An electrolytic cell was used comparable to that in FIGS. 1 and 2 wherein a 1" thick piece of carbon felt was used as both the anode and cathode. The anode was filled with a solution of 0.25M sodium sulfite in the 0.5M phosphate buffer to provide a solution in the anode compartment of the cell with a pH of 7.4. 0.60 gm of dithiothreitol as the catalyst was added to 300 ml of the slurry which was used for electrolytic reduction. This provided a catalyst (SH) mole to protein solids (SH) mole ratio of 2.8. The total SH concentration at the start of and during the reaction was monitored as described in Example 1. The theoretical level of sulfhydryl groups in the protein solids in the slurry was determined was described in Example 1 as 8798 moles (SH)

per liter. 235 ml of the slurry was processed through the cell on a continuous basis and 400 milliamp of current was applied to the cell during electrolytic reduction.

The time of measurement are recorded in Table 2, together with the calculated level of (SH) moles for the level of (SH) moles for the level of protein solids in the slurry as determined from the absorbance readings. The pH of the slurry was also continuously monitored during electrolytic reduction.

TABLE 2

| Time | Mole (SH) Protein Solids/ Liter | pH |
|---|---|---|
| 0 min. | 24,500 | 6.9 |
| 20 min. | 27,900 | 6.95 |
| 40 min. | 28,200 | 6.98 |
| 1 hr. | 28,500 | 7.0 |
| 1 hr., 20 min. | 28,100 | 7.0 |
| 2 hr., 20 min. | 28,200 | 7.2 |
| 3 hr. | 28,500 | 7.3 |
| 3 hr., 20 min. | 28,400 | 7.38 |
| 3 hr., 40 min. | 27,100 | 7.45 |
| 4 hr., 20 min. | 29,400 | 7.55 |
| 4 hr., 40 min. | 29,700 | 7.58 |

The percentage of reduction of the disulfide bonds was calculated as $$\frac{\text{Mole (SH) End of Run} - \text{Mole (SH) Beginning of Run}}{\text{Mole (SH) available for reaction in protein solids}} =$$

$$\frac{29,706 - 24,500}{8798} \times 100 = 59\%$$

It may be seen that electrolytic reduction was highly effective in achieving a substantial reduction of the disulfide bonds of the soy protein isolate to sulfhydryl groups.

EXAMPLE 3

To illustrate the use of the electrolytic reduction process of the present invention insofar as an improvement in the color of protein materials, 300 ml of an aqueous slurry of soy protein isolate having a proteinaceous solids level of 5% by weight was prepared by dispersing 15 g of dried soy isolate in 300 ml of a 0.5M phosphate buffer also containing $10^{-3}$M ethylenediaminetetraacetic acid. This resulted in a slurry with a pH of 6.8 which was not centrifuged prior to use. An electrolytic cell was used comparable to that described in FIGS. 1 and 2 wherein a ⅛" thick piece of carbon felt was used as both the anode and cathode. The anode was filled with a solution of 0.25M sodium sulfite in the 0.5M phosphate buffer to provide a solution in the anode which had a pH of 7.4. No catalyst was added to the slurry.

68 ml of the slurry was passed through the cell on a continuous basis and 100 milliamp of current was applied to the cell during electrolytic reduction for a period of 3 hours. Following electrolytic reduction, the color of the protein slurry was measured on a Hunter Colorimeter and compared to a conventionally processed soy isolate on which no electrolytic reduction was preferred, as well as a sample of 100% sodium caseinate, and a sample of 85% sodium caseinate and 15% of a conventional soy isolate. The values were obtained from using a 5% solids slurry of each sample which is adjusted to a pH of 12 and centrifuged to remove insolubles before color measurement. These values are set forth in Table 3.

TABLE 3

| | Hunter Colorimeter Readings | | | |
|---|---|---|---|---|
| Sample | L Scale | A Scale | B Scale | Whiteness Index[1] |
| 100% Sodium Caseinate | 55.0 | −0.9 | 9.9 | 25.3 |
| 85% Sodium Caseinate 15% Conventional Soy Isolate | 56.1 | −4.1 | 13.7 | 14.9 |
| Electrolytically Reduced Soy Isolate | 46.9 | −0.5 | 12.8 | 8.5 |
| Conventional Soy Isolate | 47.2 | −3.2 | 23.3 | −20.0 |

[1]Whiteness Index = L Scale reading - 3b scale reading - is intended to provide a comparative value for whiteness and the more positive the number, the better the whiteness.

It is apparent from an examination of the above values that the whiteness of the soy protein material processed by the electrolytic reduction process of the present invention was significantly improved as compared to a conventional soy isolate and was more comparable in whiteness to a mixture of sodium caseinate and a conventional soy isolate.

EXAMPLE 4

200 ml of an aqueous slurry of soy protein isolate having a proteinaceous solids level of 5% by weight was prepared by dispersing 20.0 g of dried soy isolate in 200 ml of 0.5M phosphate buffer also containing $10^{-3}$M ethylenediaminetetraacetic acid. This resulted in a slurry with a pH of 6.8. The slurry was centrifuged and the resulting supernatent had a protein content of 50 g/l. An electrolytic cell was used comparable to that described in FIGS. 1 and 2 wherein a ⅛" thick piece of carbon felt was used as both the anode and cathode. The anode was filled with a solution of 0.25M sodium sulfite in the 0.5M phosphate buffer to provide a solution in the anode which had a pH of 7.4. 64.6 mg of dithiothreitol was dissolved in 100 ml of the slurry as the catalyst. This provided a catalyst (SH) made to protein solids (SH) mole ratio of 1.6.

The total SH concentration at the start of and during the reaction was monitored as described in Example 1. The theoretical level of sulfhydryl groups in the protein solids in the slurry was determined as described in Example 1 as 5310 moles (SH) per liter. 235 ml of the slurry was passed through the cell on a continuous basis and 100 milliamp of current to the cell during electrolytic reduction.

The absorbance readings and time of measurement are recorded in Table 4 together with the calculated level of (SH) moles for the level of protein solids in the slurry as determined from the absorbance readings.

TABLE 4

| Time | Absorbance | Mole (SH) Protein Solids/liter |
|---|---|---|
| 0 | 1.250 | 9,154 |
| 2.5 hr. | 1.673 | 11,934 |
| 3 hr. | 1.692 | 12,074 |

The percentage reduction in disulfide bonds was calculated as $$\frac{\text{Mole (SH) End of Run} - \text{Mole (SH) Beginning of Run}}{\text{Mole SH available for reaction in protein solids}} =$$

$$\frac{12{,}074 - 9154}{5310} \times 100 = 66.8\% \text{ reduction}$$

The color of the protein material before and after electrolytic reduction was measured by a Hunter Colorimeter as described in Example 3. These values are set forth in Table 5.

TABLE 5

| Hunter Colorimeter Values | | | | |
|---|---|---|---|---|
| | L Scale | A Scale | B Scale | Whiteness Index |
| Before | 44.19 | 0.98 | 22.79 | −24.18 |
| After | 47.54 | +1.01 | 17.35 | −4.66 |

It may be seen that a significant improvement in whiteness was achieved as well as a substantial reduction in the disulfide bonds contained in the protein material.

The above Examples represent specific but non-limiting embodiments of the present invention. It is intended to include within the scope of the present invention all other modifications, equivalents, or substitutions apparent to one skilled in the art without departing from the spirit and scope of the invention.

What is claimed is:

1. A process for the treatment of a vegetable protein material to improve the whiteness thereof comprising:
    (a) forming an aqueous slurry of the vegetable protein material having a pH of between about 4.5 and 8 and a proteinaceous solids level of between about 1 and 20% by weight,
    (b) electrolytically reducing said slurry to thereby improve the whiteness of said protein material.

2. The process of claim 1 wherein said slurry has a proteinaceous solids level of between about 10 and 18% by weight.

3. The process of claim 1 wherein said slurry is maintained at a temperature below about 60° C.

4. The process of claim 3 wherein said slurry is maintained at a temperature of between about 15° and 60° C.

5. The process of claim 1 wherein said vegetable protein is soy protein.

6. The process of claim 1 wherein said material is a vegetable protein isolate.

7. The process of claim 6 wherein said isolated vegetable protein has been acid precipitated and dried.

8. The process of claim 1 wherein electrolytic reduction is carried out at a current density such that an improvement in whiteness of the protein material takes place.

9. The process of claim 8 wherein electrolytic reduction is carried out at a current density of at least 2 m amp/m².

10. The process of claim 1 including the step of dewatering said electrolytically reduced slurry.

11. A process for the treatment of a vegetable protein material having disulfide bonds wherein a substantial amount of said disulfide bonds are reduced comprising:
    (a) forming an aqueous slurry of said vegetable protein material having a pH of between about 4.5 and 8.0 and a proteinaceous solids level of between about 1 and 20% by weight, and
    (b) electrolytically reducing the disulfide bonds of said vegetable protein material.

12. The process of claim 11 wherein said slurry has a proteinaceous solids level of between about 10 and 18% by weight.

13. The process of claim 11 wherein said slurry has a pH of between about 6 and 8.

14. The process of claim 11 wherein said slurry is maintained at a temperature below about 60° C.

15. The process of claim 13 wherein said slurry is maintained at a temperature between about 15° and 60° C.

16. The process of claim 11 wherein said vegetable protein is soy protein.

17. The process of claim 11 wherein said vegetable protein material is a vegetable protein isolate.

18. The process of claim 17 wherein said isolated vegetable protein has been acid precipitated and dried.

19. The process of claim 11 wherein said slurry includes a catalyst in an amount effective to catalyze said reduction.

20. The process of claim 19 wherein said catalyst is a sulfhydryl reagent.

21. The Process of claim 20 wherein said sulfhydryl reagent is selected from the group consisting of diothiothreitol and cysteine.

22. The process of claim 11 wherein electrolytic reduction is carried out at a current density such that substantial reduction of the disulfide bonds of the vegetable protein material takes place.

23. The process of claim 22 wherein electrolytic reduction is carried out at a current density of at least about 2 m amp/m².

24. A process for the treatment of an isolated vegetable protein having disulfide bonds wherein a substantial amount of said disulfide bonds are reduced comprising:
    (a) forming an aqueous slurry of said isolated vegetable protein having a pH of between about 4.5 and 8.0 and a proteinaceous solids level of between about 1 and 20% by weight,
    (b) adding a catalyst to said slurry in an amount effective to catalyze the reductions of the disulfide bonds, and
    (c) electrolytically reducing the disulfide bonds of said isolated vegetable protein.

25. The process of claim 24 wherein said slurry is maintained at a temperature below about 60° C.

26. The process of claim 24 wherein said vegetable protein is soy protein.

27. The process of claim 24 including the step of dewatering said electrolytically reduced slurry.

28. The process of claim 24 including the step of treating said reduced disulfide bonds with a blocking agent in an amount effective to prevent substantial reformation of said disulfide bonds.

29. The process of claim 28 wherein said blocking agent is iodoacetic acid.

30. The process of claim 24 wherein said isolated vegetable protein is in the form of an acid precipitated curd.

31. The process of claim 24 wherein said isolated vegetable protein has been acid precipitated and dried.

32. The process of claim 24 wherein said slurry has a proteinaceous solids level of between about 10 and 18% by weight.

* * * * *